United States Patent [19]
Haneda et al.

[11] Patent Number: 6,094,552
[45] Date of Patent: Jul. 25, 2000

[54] IMAGE FORMING APPARATUS FOR PRINTING IMAGES IN ACCORDANCE WITH AT LEAST ONE OF FIRST INFORMATION AND SECOND INFORMATION

[75] Inventors: Satoshi Haneda; Kunio Shigeta; Yotaro Sato; Akitoshi Matsubara; Tadayoshi Ikeda; Masakazu Fukuchi, all of Hachioji, Japan

[73] Assignee: Konica Corporation, Tokyo, Japan

[21] Appl. No.: 08/995,375

[22] Filed: Dec. 22, 1997

[30] Foreign Application Priority Data

Dec. 26, 1996 [JP] Japan ................................. 8-347616

[51] Int. Cl.[7] .................................................. G03G 15/04
[52] U.S. Cl. ............................................................ 399/193
[58] Field of Search ................................... 399/182, 183, 399/193, 367, 374

[56] References Cited

U.S. PATENT DOCUMENTS

| | | | |
|---|---|---|---|
| 4,674,864 | 6/1987 | Stakenborg et al. | 399/193 |
| 4,745,441 | 5/1988 | Maruta et al. | 399/193 |
| 4,819,029 | 4/1989 | Ito | 399/193 |

*Primary Examiner*—William J. Royer
*Attorney, Agent, or Firm*—Frishauf, Holtz, Goodman, Langer & Chick, P.C.

[57] ABSTRACT

An image forming apparatus includes a reversing unit for reversing a two-sided document and placing the document on a platen, a reading unit for reading image data of either a front or back side of the document placed on the platen by the reversing unit, and at least one of: (i) a first detecting/setting unit for providing first information representing a position on which a binding margin of the document is located and a direction in which a top or bottom portion of the document is directed, and (ii) a second detecting/setting unit for providing second information representing a position on which a binding margin of an image to be printed is located and a direction in which a top or bottom portion of the image to be printed is directed. An image converting unit is provided for converting the read image data into output image data according to at least one of: (i) the first information with respect to the position of the binding margin of the document and the direction of the document, and (ii) the second information with respect to the position of the binding margin of the image to be printed and the direction of the image to be printed. And a writing unit is provided for printing the image to be printed according to the output image data.

9 Claims, 14 Drawing Sheets

| No | PLACING METHOD OF TWO-SIDED DOCUMENT | ONE-SIDED PRINTED IMAGE |
|---|---|---|
| 1 | 211, 401, 21, H | 501, H |
| 2 | 211, 402, 21, H | 502, H |

| No | PLACING METHOD OF TWO-SIDED DOCUMENT | ONE-SIDED PRINTED IMAGE |
|---|---|---|
| 1 | 211, 21, H, 401 | H, 501 |
| 2 | 211, 21, H, 402 | H, 502 |

| No | PLACING METHOD OF TWO-SIDED DOCUMENT | CASSETTE USED | ON-SIDED PRINTED IMAGE |
|---|---|---|---|
| 1 | 211, H, 401, 21 | 151 | 501, H, 1 |
| 2 | 211, H, 402, 21 | 151 | 502, H, 2 |

| No | PLACING METHOD OF ONE-SIDED DOCUMENT | CASSETTE USED | PRINTED IMAGE |
|---|---|---|---|
| 1 | 211, 21, 40 | 151, P | 50 |
| 2 | 211, 21, 40 | | |
| 3 | 211, 21, 40 | 152, P | 50 |
| 4 | 211, 21, 40 | | |

| No | PLACING METHOD OF TWO-SIDED DOCUMENT | PRINTED IMAGE |
|---|---|---|
| 1 | 211, 401, H, 21 | 501, 1, H |
| 2 | 211, 402, H, 21 | 502, 2, H |

IMAGE FORMING APPARATUS FOR PRINTING IMAGES IN ACCORDANCE WITH AT LEAST ONE OF FIRST INFORMATION AND SECOND INFORMATION

BACKGROUND OF THE INVENTION

The present invention relates to an image forming apparatus in which a latent image of a document formed on an image forming body is developed by a developing device to form a toner image which is transferred to an image receiving sheet to make a printed image.

Conventionally, there have been employed various kinds of documents according to the difference in binding margin and vertical and horizontal positions. One example of the kinds of documents is shown in FIGS. 13(A) to 13(C). FIG. 13(A) shows a left binding margin and vertical direction; FIG. 13(B) shows an upper binding margin and horizontal direction and FIG. 13(C) shows a right binding margin and vertical direction.

(Conventional Technology 1) In an image forming apparatus, reading a both-sided document is determined by a scanning direction against the document placed on a document platen and the front side or back side of the document is also determined by a document reversing means. On account of the above, according to the placement of the document on the document platen, the document varies as follows. FIG. 14 shows the relationship between a document placing method as a conventional example and a printed image. When a front side 401 of a both-sided document 40 having a left binding margin is placed against a document stopper 211 of a document glass 21 and a front side printed image 501 is obtained. Furthermore, when a back side printed image 502 is obtained by placing a back side 402 of the both-sided document 40 against the document stopper 211, a right binding margin can be made for a back side printed image 502.

(Conventional Technology 2) Furthermore, in the image forming apparatus, for example, when a document is placed on a document platen in a vertical direction and is read, it is designed so as to obtain a printed image in a vertical position.

Therefore, no desired printed image can be occasionally made due to a document placing method, kinds of an image receiving material cassette, etc. For example, the above case corresponds to that for an A4R document (horizontal placement of an A4 document), only A4 is available in an image receiving material cassette (A4 print).

SUMMARY OF THE INVENTION

In view of the above-mentioned problems, the present invention has been accomplished. A first object of the present invention is to provide an image forming apparatus to obtain a printed image according to the information on the direction of a binding margin of a both-sided document and the vertical direction of the document.

A second object of the present invention is to provide an image forming apparatus to obtain a desired printed image according to the information on the binding margin direction of a print and the vertical direction of the print.

A third object of the present invention is to provide an image forming apparatus to obtain a desired printed image according to the above-mentioned document attributes information of the both-sided document and printing information.

A fourth object of the present invention is to provide an image forming apparatus to obtain a desired printed image according to the vertical/horizontal conversion which performs the conversion of the vertical/horizontal direction of the image data of a both-sided document.

The above-mentioned objects are accomplished by any one of means described hereinafter, that is:

(1) an image forming apparatus comprising a document reversing means which reverses the front side or back side of a both-sided document, a reading means which reads image data from the front side or back side placed on a document platen by the above-mentioned document reversing means, a document attributes information detecting means which detects a binding margin direction of the above-mentioned document and the top or bottom position in the vertical direction of the document and an image data converting means which converts the above-mentioned image data according to the above-mentioned document attributes information, which is characterized in that writing an image is carried out employing the above-mentioned image data, and a printed image is obtained.

(2) an image forming apparatus comprising a reading means which reads image data from a document placed on a document platen, a printing information setting means which sets printing information on a binding margin direction of a printed image and the top or bottom position in a vertical direction of the printed image and an image data converting means which converts the above-mentioned image data to an output image data based on the placement of the above-mentioned printing information, which is characterized in that writing an image is carried out employing the above-mentioned output image data to obtain a printed image.

(3) an image forming apparatus comprising a document reversing means which reverses the front side or back side of a both-sided document, a reading means which reads the image data of the front side or back side of the document placed on the document platen by the above-mentioned document reversing means and a document printing means which detects document and printing information on the above-mentioned binding margin direction, the top or bottom position in vertical document direction, a binding margin direction of a printed image and the top or bottom position in the vertical direction of the printed image, and an image data converting means which converts the above-mentioned image data to output image data based on the above-mentioned document, printing information, which is characterized in that writing an image is carried out according to the above-mentioned output image data to obtain a printed image.

Or (4) in an image forming apparatus in which a toner image formed on an image forming body is transferred to the front surface of an image receiving material, while after transferring once a toner image formed on the image forming body to a toner image receiving body, the toner image is repeatedly transferred to the back surface of the image receiving material and the both sides of the image receiving material, toner images are formed and fixed, the image forming apparatus being characterized in having a vertical/horizontal direction converting means which carries out the conversion of the vertical/horizontal direction for a document image 1 such that and obtaining a both-sided printed image is obtained upon forming a toner image converted in terms of the vertical/horizontal direction thereof.

BRIEF DESCRIPTION OF THE DRAWINGS

FIG. 9 is a table illustrating the relationship between a document placing method as one example and a printed image.

FIG. 12 is a table illustrating the relationship between a document placing method as one example and a printed image.

DETAILED DESCRIPTION OF THE PREFERRED EMBODIMENT

Figure 1:
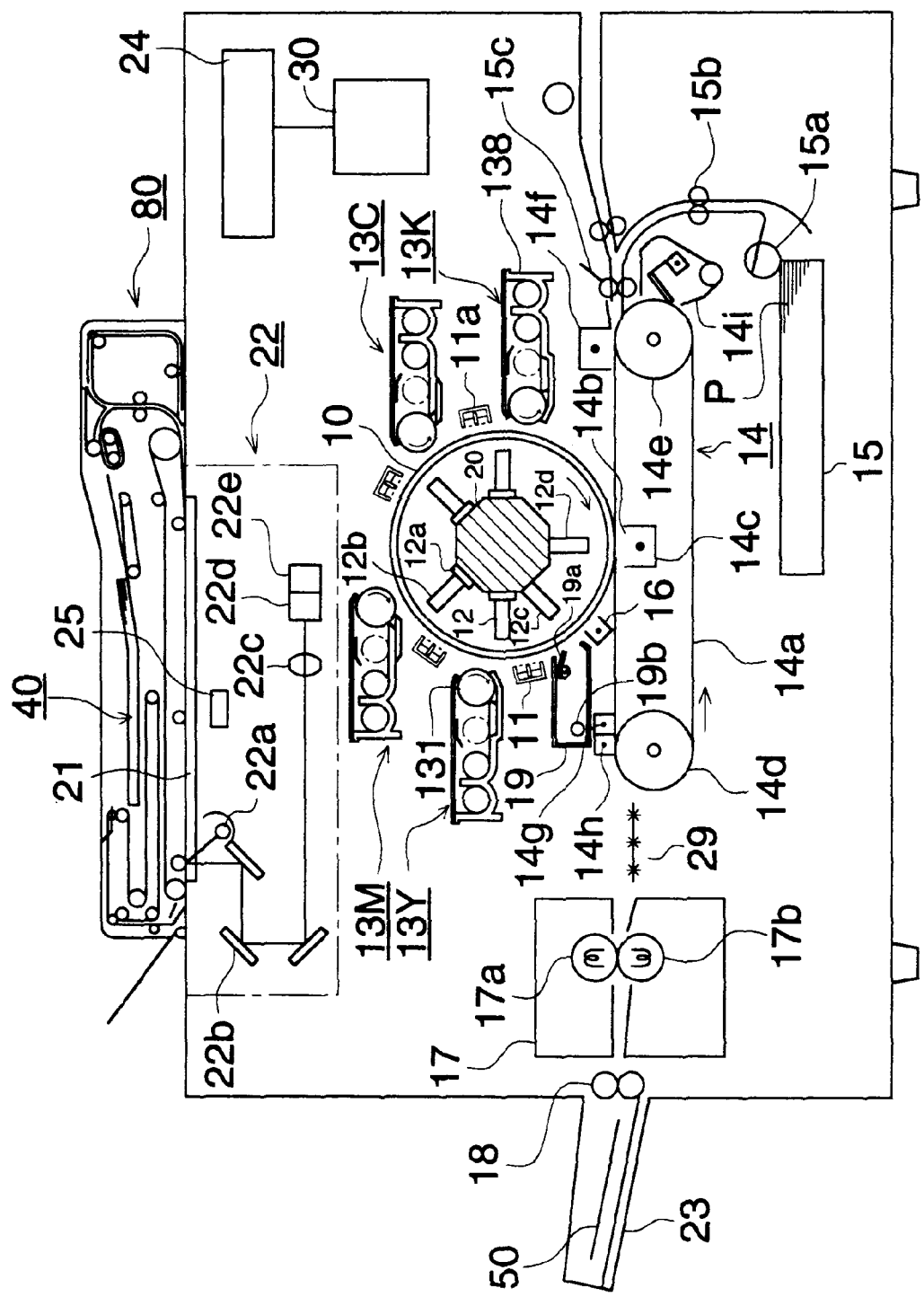
FIG. 1 is a schematic diagram illustrating an image forming apparatus common to embodiments.

An image forming apparatus common to embodiments of the present invention is explained with reference to figures. FIG. 1 is a schematic diagram illustrating the image forming apparatus common to the embodiments. In FIG. 1, the structure of a photoreceptor drum 10 as an image holding member is that of a cylindrical base body formed by a transparent member such as, for example, glass or transparent acrylic resin is interiorly provided and a photosensitive layer such as a transparent electrically conductive layer, a-Si layer or organic photosensitive layer (OPC), etc. is formed on an outer circumferential surface of the base body. The photoreceptor 10 is rotated clockwise as shown as arrow in FIG. 1.

A scorotron charging device 11 as a charging device is employed for the image forming process of each color of yellow (Y), magenta (M), cyan (C) and black (K), and is attached in the right direction against the moving direction of the photoreceptor drum 10, while facing against the photoreceptor drum 10 and renders uniform potential to the photoreceptor drum 10.

An exposure unit 12 as an image exposure means for each color is arranged in such a way that an exposure position on the photoreceptor drum 10 is placed between a discharge electrode 11a of the scorotron charging device 11 and a development position of each of the developing devices 13Y, 13M, 13C and 13K, while being provided in the upstream side in a rotation direction of the photoreceptor drum relating to a developing sleeve 131.

The exposure unit 12 is constructed as a unit for exposure in which a line exposure element 12a in which a plurality of LEDs (light emitting diodes) as an image exposure light emitting element arranged in parallel with the shaft of the photoreceptor drum 10 and a Selfoc lens 12b as a life size focusing element are attached to a supporting body 20.

A reading means 22 is constructed in such a way that a document 40 on a document platen 21 is illuminated by a lamp 22a and the resulting light image is reflected by a mirror 22b, transmitted through a lens 22c and a prism 22d and read by a CCD 22e.

Furthermore, the image data of each color read by the above-mentioned reading means 22 provided above the surface of the apparatus are input to the exposure unit 12 for each color as an electric signal.

Developing devices provided above the rotated photoreceptor drum according to image forming color order and the color order of the rotated photoreceptor drum against the rotation direction of the photoreceptor drum 10 as shown as an arrow in FIG. 1, Y and M developing devices 13Y and 13M are arranged on the left side of the photoreceptor drum 10, and C and K developing devices 13C and 13K are arranged on the right side of the photoreceptor drum 10, and Y and M scorotron charging devices 11 are arranged below a developing casing 138 of the Y and M developing devices 13, and C and K scorotron charging devices 11 are arranged above the developing casing 138 of C and K developing devices 13.

The developing device for each color is loaded with a one-component or two-component developer of each of yellow (Y), magenta (M), cyan (C) and black (K), and rotates in the same direction as that of the photoreceptor drum 10 at the development position, while keeping a predetermined gap against the circumferential surface of the photoreceptor drum 10.

The developing device 13 of each color in such a way that an electrostatic latent image on the photoreceptor drum 10 formed by charge application employing the above-mentioned scorotron charging device 11 and an image exposure undergoes reversal development using a toner having the same polarity as that of the charging electrode under non-contact state employing a non-contact development method by voltage application of the development bias voltage.

Upon starting image recording, a photoreceptor driving motor not shown starts and the photoreceptor drum 10 is rotated clockwise in an arrow direction shown in FIG. 1 by a driving gear. At the same time, the application of electric potential to the photoreceptor drum 10 is commenced by charging action of the Y scorotron charging device 11 which is arranged on the left side of the photoreceptor drum 10 and under the developing casing 138 of the yellow (Y) developing device 13Y.

After the photoreceptor drum 10 is charged, in the Y exposure unit 12, an exposure is initiated by first color signals, that is, electric signals corresponding to the image data of Y, and an electrostatic latent image corresponding to the Y image of a document is formed on the outer surface of the photosensitive layer by rotation scanning of the photoreceptor drum.

The above-mentioned latent image is subjected to reversal development under the non-contact state of the developer on the developing sleeve, and an yellow (Y) toner image is formed in accordance with the rotation of the photoreceptor drum 10.

Subsequently, on the above-mentioned yellow (Y) toner image, further, charging the photoreceptor drum is carried out by charging action of the scorotron charging device 11 for magenta (M) arranged on the left side of the photoreceptor drum 10 above the yellow (Y) and under the development casing 13B of the developing device 13 for M; an exposure is performed by second color signals of an exposure unit for M, that is, electric signals corresponding to the image data of M and a magenta (M) toner image is formed to be superimposed on the above-mentioned yellow (Y) toner image by non-contact reversal development employing the developing device 13 for M.

In accordance with the same process, by employing the scorotron charging device 11 for cyan (C) arranged on the right side of the photoreceptor drum 10 and above the developing casing 13B of the developing device 13 for cyan (C), the exposure unit 12 for C and the developing device 13 for C, a cyan toner image corresponding to the third color signals is further formed to be superimposed and furthermore, by employing the scorotron charging device 11 for black (K) arranged on the right side of the photoreceptor drum 10 under the C and above the developing casing 13B of the developing device 13 for black (K), the exposure unit 12 and the developing device 13, a black toner image corresponding to the fourth color signals is formed to be superimposed, and during one rotation of the photoreceptor drum 10, colored toner images are formed on the circumferential surface.

Exposures onto the organic photosensitive layer of the photoreceptor drum 10 using the exposure units 12 of these Y, M, C and K are carried out through the above-mentioned base body from the interior of the photoreceptor drum 10. Accordingly, any of image exposures corresponding to the second, third and fourth color signals is carried out, without any effect caused by the previously formed toner images, and thus, it is possible to form an electrostatic latent image equivalent to that corresponding to the first color signals.

With the use of the above-mentioned image forming process, on the photoreceptor drum 10 as the image holding body, superimposed colored toner images which become a back side image are formed, and the superimposed colored toner images as the back side image are simultaneously transferred, in a transfer zone 14b, employing a transfer device 14c to which a direct current voltage having an opposite polarity to that of toner, to a toner image receiving body 14a which is bridged between a drive roller 14d and a driven roller 14e so as to be adjusted to or in contact with the photoreceptor drum 10. At the time, in order that the transfer is preferably carried out, for example, a uniform exposure is carried out by a transfer simultaneous exposure device 12d employing light emitting diodes.

The toner remaining on the circumferential surface of the photoreceptor drum 10 after the transfer is subjected to charge elimination by an image holding body AC charge eliminating device 16; is then advanced to a cleaning device 19; is cleaned by a cleaning blade 19a composed of a rubber material in contact with the photoreceptor drum 10; further, in order to erase the hysteresis of the photoreceptor up to the previous print, the charge on the circumferential surface of the photoreceptor is eliminated by an exposure prior to charging employing, for example, a uniform exposure device 12c comprising light emitting diodes; the charge formed at the previous print making is eliminated and a front side color image formation is then carried out.

The front side color image is brought into synchronization with the back side image formed on the toner image receiving body 14a at the transfer zone 14b and in the same way as the above-mentioned color image forming process, the front side image of the superimposed colored toner images is formed on the photoreceptor drum 10. It is necessary to alter the image data so that the front side image formed at the time on the image holding body becomes a mirror image each other against the back side image.

The image receiving material P is advanced from a sheet cassette 15 as an image receiving material storing means by an advancing roller 15a; transported by a transport roller 15b and conveyed to a timing roller 15c.

The image receiving material P is transported to the transfer zone 14b, while the colored toner image of the front side supported on the photoreceptor drum and the colored toner image of the back side supported by the toner image receiving body 14a are synchronously driven by a timing roller 15c. At this time, the image receiving material P is subjected to paper charging under the same polarity as that of the toner by a paper charging device 14f, adsorbed by the toner image receiving body 14a and transported to the transfer zone 14b. The paper charging having the same polarity as that of the toner prevents the distortion of the toner image caused by attracting force applied to the toner image on the toner image receiving body or toner image on the image holding body.

The front side image on the circumferential surface of the photoreceptor drum 10 is simultaneously transferred to the side of the image receiving material by the transfer device 14c to which a voltage having the opposite polarity of the toner is applied. At this time, the back side image on the circumferential surface of the toner image receiving body 14a is not transferred to the image receiving material P but remains on the toner image receiving body 14a. Thereafter, the back side image on the circumferential surface of the toner image receiving body 14a is simultaneously transferred to the back side of the image receiving material P by a back side transfer device 14g to which the voltage having the opposite polarity of the toner is applied. In the case of the transfer by the transfer device 14c, there is provided an exposure device in the interior of the photoreceptor drum 10 facing the transfer device 14c so that the excellent transfer is carried out. For example, a uniform exposure is carried out by a transfer simultaneous exposure device 12d employing light emitting diodes. Further, because a toner image for each color is superimposed, in order to enable the simultaneous transfer, an upper layer and a lower layer of the toner layers are preferably charged with the same charge polarity.

Colored toner images having the same polarity, which are formed by superimposition upon repeating the reversal development on the image holding body are simultaneously transferred to the toner image receiving body 14a without changing the polarity and are then transferred to a recording sheet P without changing the polarity. The above-mentioned process contributes preferably to the improvement in the transferability for the formation of a back side image. For the formation of a front side image, a process in that the reversal development is repeated on the image holding body and colored toner images having the same polarity formed by superimposition are simultaneously transferred to the image receiving material P without changing the polarity contributes preferably to the improvement of the transferability for the formation of the front side image.

The image receiving material in which colored toner images are formed on both sides is subjected to charge elimination by a sheet separating AC charge eliminating device 14h employed for the separation of the image receiving material, separated from the toner image receiving body 14a, conveyed above a spur 29, and conveyed to a fixing device 17 as a fixing means composed of two rollers having interiorly heaters in both the rollers. The toner adhered on the front and back sides of the image receiving material P is subjected to heat and pressure between a fixing roller 17a and a pressure roller 17b and fixed, and the image receiving material subjected to image recording on both sides is advanced by sheet ejecting rollers 18 and ejected to a tray 23 placed on the outside of the apparatus.

The toner which remains on the circumferential surface of the toner image receiving body 14a after the transfer is cleaned by a cleaning device 14i in the toner image receiving body. Furthermore, the toner which remains on the circumferential surface of the photoreceptor drum 10 after the transfer is subjected to charge elimination by the AC charge eliminating device 16, then advanced to the cleaning device 19, scraped off into the cleaning device 19 by a cleaning blade 19a in contact with the photoreceptor drum 10, which is made from a rubber material and collected by a screw 19b into a toner collecting vessel not shown. The photoreceptor drum 10 from which the remaining toner is removed by the cleaning device 19 is uniformly charged by the scorotron charging device 11 for Y and is advanced to the next image forming cycle.

(Embodiment 1)

Figure 2:
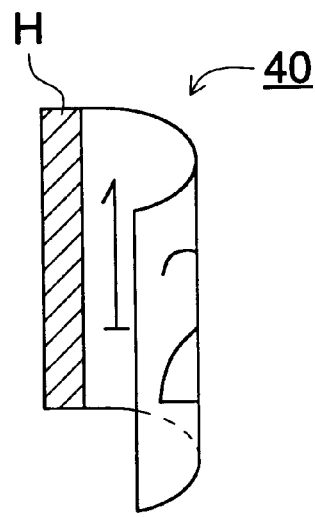
FIG. 2 is a table illustrating the relationship between a document placing method as one example and a printed image.
Figure 3:
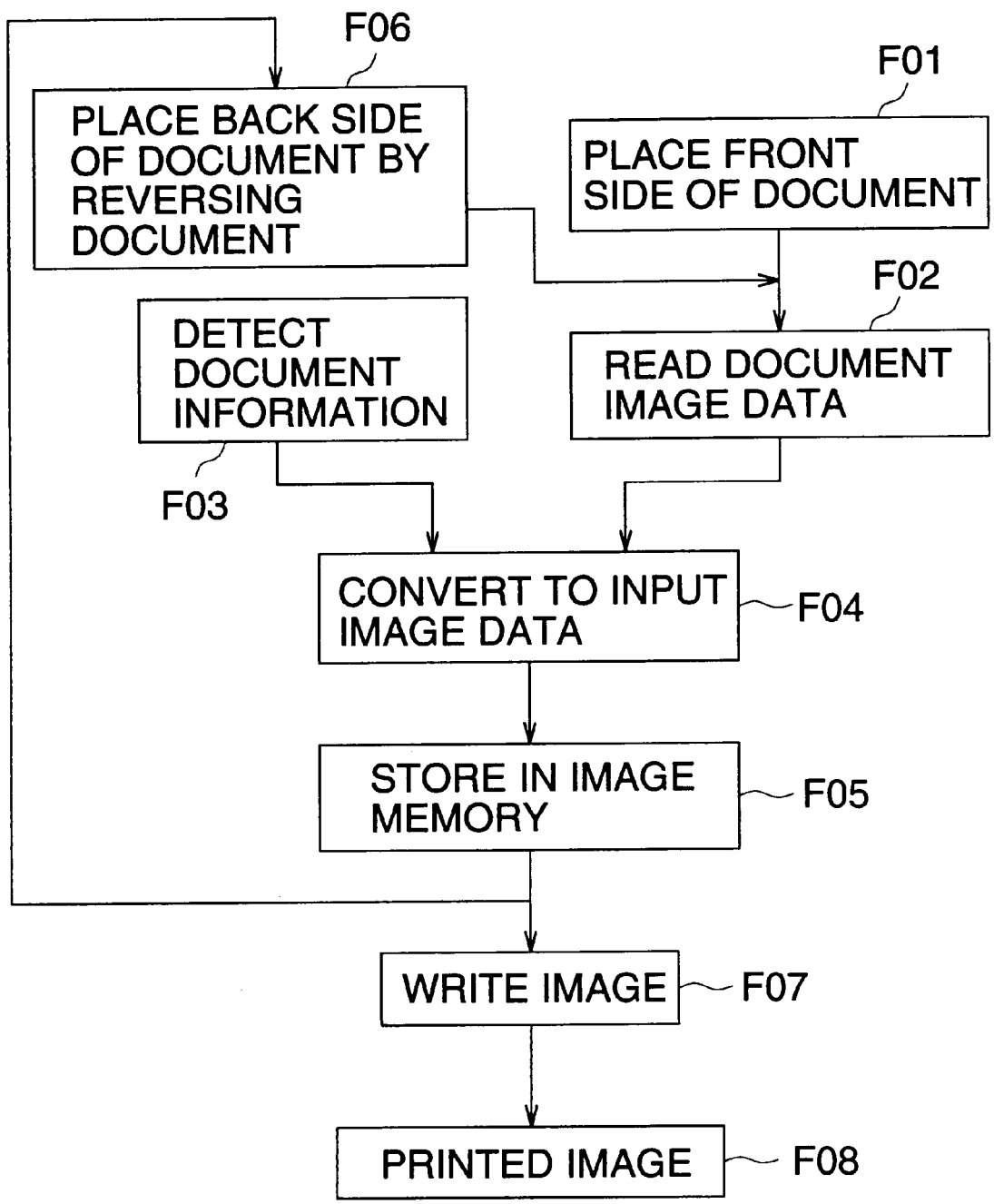
FIG. 3 is a flowchart illustrating main processes of a printing operation.

The image forming apparatus of the Embodiment 1 is explained with reference to figures. FIG. 2 is a table illustrating the relationship between a document placing method as one example and a printed image and FIG. 3 is a flowchart illustrating main processes of a printing operation. Further, explanation on members which are mechanically, operationally the same as those in FIG. 1 are abbreviated.

In FIG. 1, a document reversing device 80 as a document reversing means is the device which reverses the front side 401 or back side 402 of the both-sided document 40. Further, a reading means 22 is constructed so as to read image data from the front side or back side of the document 40 placed on the document platen 21 by the document reversing device 80. Furthermore, a document attributes information detecting sensor 25 as a document attributes information detecting means is constructed so as to detect document attributes information such as the direction of a binding margin H of the document 40, a vertical direction of the document 40 against the document platen 21, etc. Furthermore, an image data converting means in a control section 30 converts the image data to input image data according to the document information. Further, an image memory stores according to order of one-sided page or both-sided page. Further, the document attributes information may be set manually.

With reference to FIG. 2, the relationship between a document placing method as one example and printed image is explained. The document 40 is a both-sided document having a left binding margin and takes one-sided printed image. When on the document platen 21, the front side 401 is placed with an image upward at a document stopper 211, a one-sided printed image 501 becomes like No. 1 as shown in the table. Subsequently, when the back side 402 is placed on the document platen 21, the binding margin of a one-sided printed image 502 is changed to a left binding margin as shown in No. 2 of the chart.

Here, printing operation is explained. The front side document 401 is placed on the document platen 21 (F01). The image data of the front side document 401 are read by the data reading means 22 (F02). Furthermore, the information of the front side document 401 is detected by the document attributes information detecting sensor 25 (F03). And it is converted to an input image data (F04). Thereafter, the input image data are stored in the image memory according to order of one-sided page or both-sided page (F05). They are then converted to the back side document 402 by the document reversing device 80 (F06). Thereafter, they are stored in the image memory like as the front side. At this time, writing an image (F07) is carried out and after the transfer and fixing, a printed image (F08) is obtained.

Further, when printing is carried out for the both-sided document according to order of page, the binding margin direction and vertical direction are standardized employing the conversion function. While a toner image formed on the image forming body is transferred to the front side of an image receiving material, the toner image formed on the image forming body is once transferred to the toner image receiving body and thereafter, transferred again to the back side of the image receiving material to form toner images on both sides of the image receiving material and the transferred images are fixed.

Furthermore, when a both-sided document is copied in order of the one side, the binding margin direction and vertical direction of each page is to be standardized employing the conversion function. Further, the image data are stored into the image memory in order of both-sided page according to the information on the binding margin direction and verticals direction of the document. Further, the information on the binding margin direction may be manually input upon observing the document. Or, upon reading the document utilizing a scanner, the binding margin direction may be detected by pattern recognition of the document according to the image data. Further, upon observing the document, the information on the vertical direction of the document may be manually input, or the document is read by a scanner and the binding margin direction may be then detected by pattern recognition of the document according to the image data.

(Embodiment 2)

Figure 4:
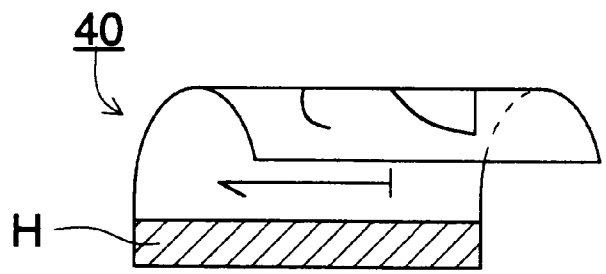
FIG. 4 is a table illustrating the relationship between a document placing method as one example and a printed image.
Figure 5:
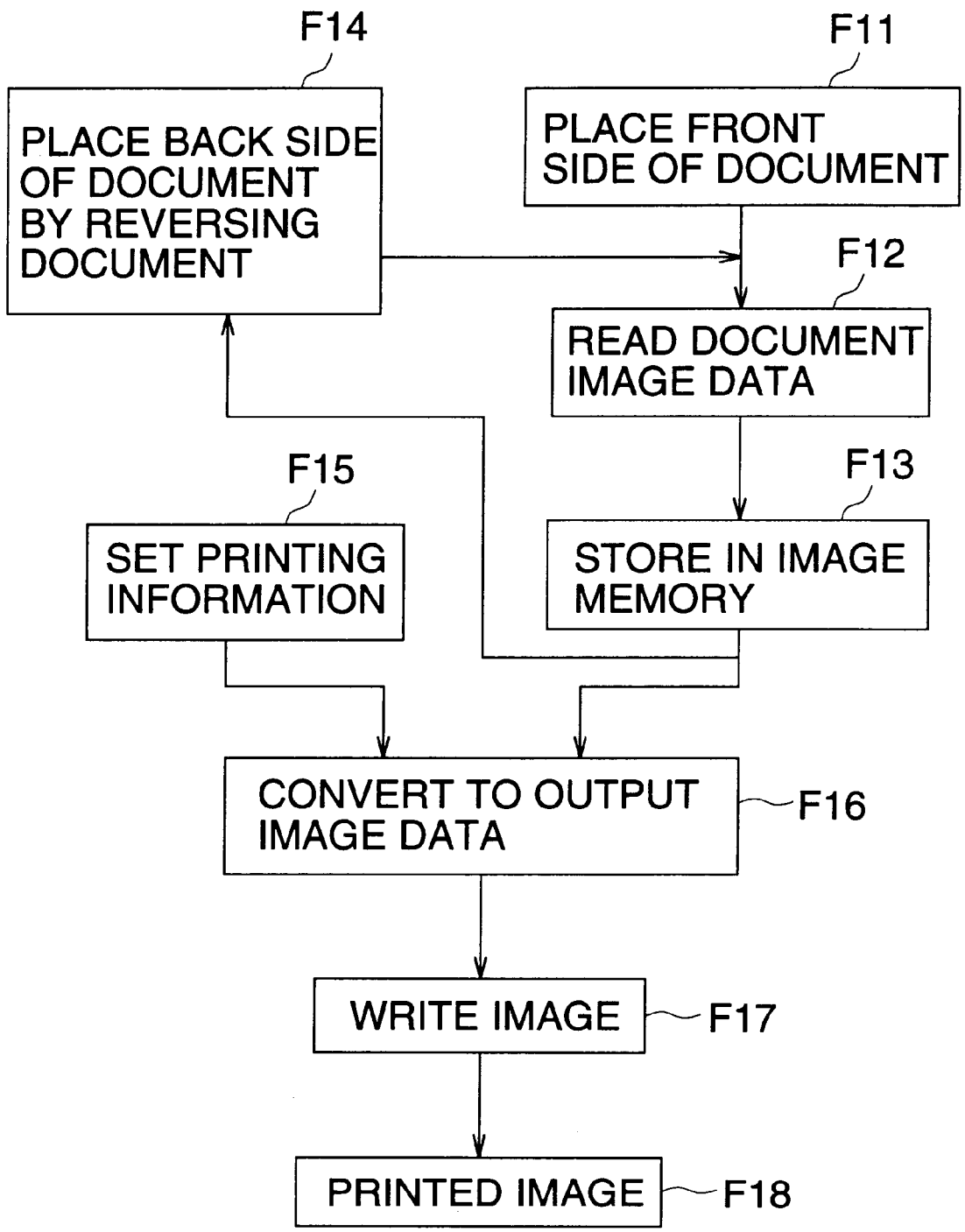
FIG. 5 is a flowchart illustrating main processes of a printing operation.

The image forming apparatus of Embodiment 2 is explained with reference to figures. FIG. 4 is a table illustrating the relationship between a document placing method as one example and a printed image and FIG. 5 is a flowchart illustrating main processes of a printing operation. Further, explanation on members which are mechanically, operationally the same as those in FIG. 1 are abbreviated.

In FIG. 1, the document reversing device 80 as a document reversing means is a device which reverses the front side document 401 or the back side document 402 of the both-sided document 40. Further, the reading means 22 reads image data from the document 40 placed on the document platen 21. Furthermore, a printing information setting means which is one part of the control section 30 sets the information on the binding margin direction and vertical direction of a printed image. Furthermore, the image data converting means converts to the output image data according to the document image data printing information. Further, the image memory is converted in order of one side page or both side page. Further, the printing information may be manually set.

With reference to FIG. 4, the relationship between a document placing method as one example and a printed image is explained. The front side 401 of the document 40 is placed on the document platen 21 and a front side printed image 501 is obtained. In the same manner, the back side 402 of the document 40 is placed on the document platen 21 and a back side printed image 502 in which the top of the image is converted is obtained.

Here, printing operation is explained. The front side document 401 is placed on the document platen 21 (F11). And the image data are read (F12) and are stored in the image memory (F13). In the same way, the back side document 402 is placed employing the document reversing device 80 (F14) and is stored in the image memory. At this time, by setting the printing information (F15), they are converted to the output image data (F16). According to the output image data, writing an image is carried out (F17) and a printed image is obtained through the transfer and fixing (F18).

(Embodiment 3)

Figure 6:
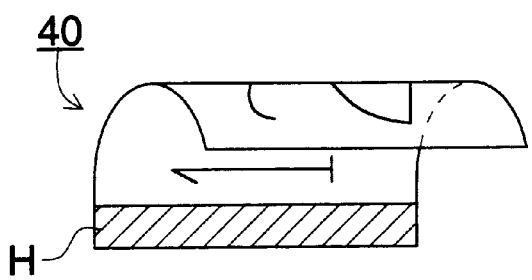
FIG. 6 is a table illustrating the relationship between a document placing method as one example and a printed image.
Figure 7:
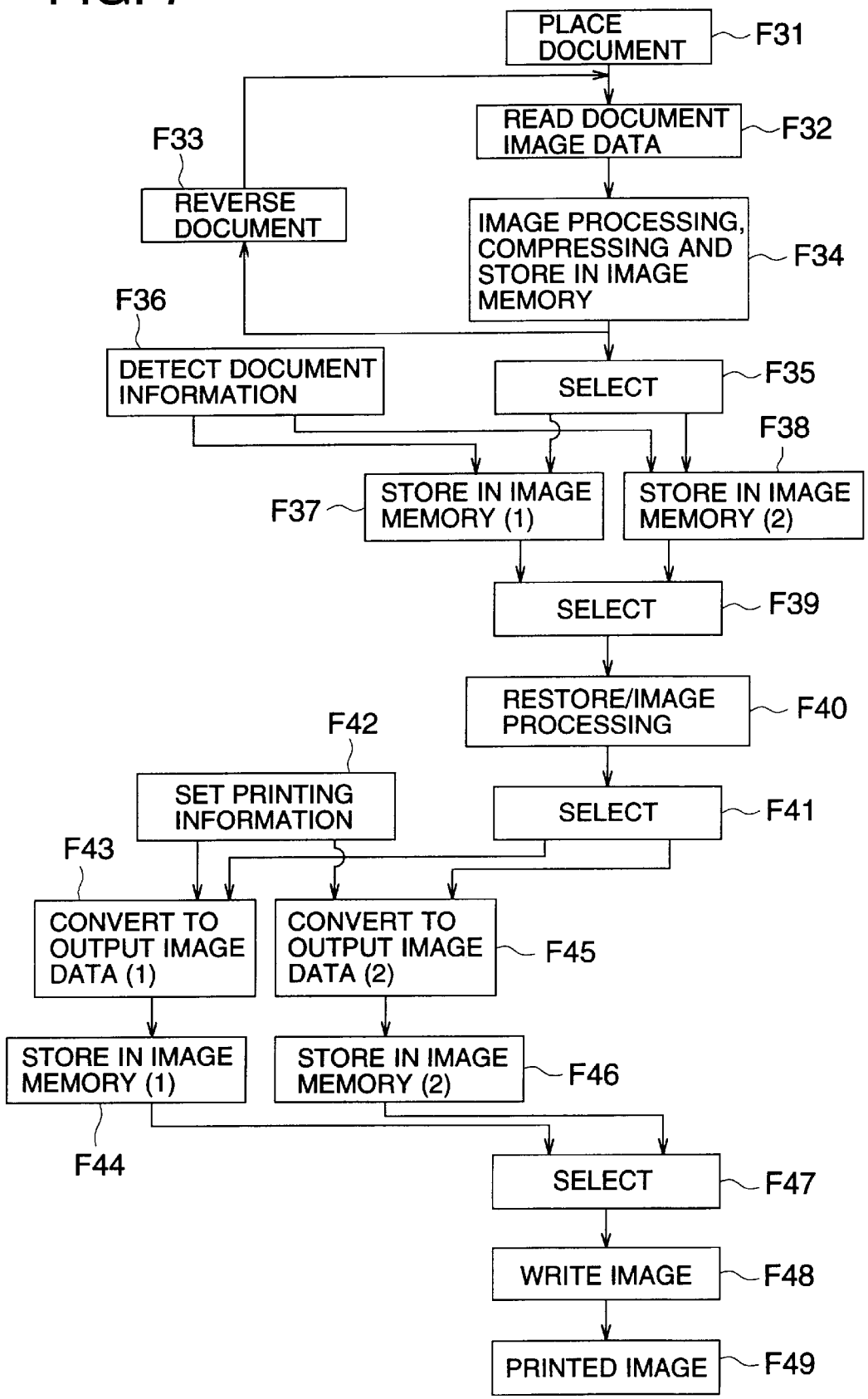
FIG. 7 is a flowchart illustrating main processes of a printing operation.

With reference to figures, the image forming apparatus of Embodiment 3 is explained. FIG. 6 is a table illustrating the relationship between a document placing method as one example and a printed image and FIG. 7 is a flowchart illustrating main processes of a printing operation. Further, explanation on members which are mechanically, operationally the same as those in FIG. 1 are abbreviated.

In FIG. 1, the document reversing device 80 as a document reversing means is a device which reverses the front side or the back side of a both-sided document. Further, the reading means 22 is constructed so as to read image data from the front side or back side of the document 40 placed on the document platen 21. Furthermore, the document attributes information detecting sensor 25 as a document printing information means which is a portion of the control section 30 detects the information such as the binding margin direction, vertical direction, etc. of the document 40 placed on the document platen 21. Furthermore, the information on printing of the document and printing information means is constructed so as to detect manually or automatically the information on the binding margin direction and vertical direction of a printed image. Furthermore, the image data converting means writes in a form of image the above-mentioned document image data as the output image data according to the information of the above-mentioned document and printing information means and a printed image is obtained through transfer and fixing.

With reference to FIG. 6, the relationship between a document placing method as one example and a printed image is explained. When the front side 401 of the both-sided document 40 having a left binding margin is firstly placed, the one-sided front side printed image 501 transported from a vertical cassette 151 is obtained as shown in the figure. Next, when the back side document 402 is placed on the document platen 21 through the document placement, a one-sided back side printed image 502 becomes as shown in the figure. And the front side printed image 501 and the back side printed image 502 are piled up and bound.

Printing operation is explained with reference to FIGS. 1, 6 and 7. At first, a document is placed (F31). At the time, the document image data are read (F32). Furthermore, they undergo image processing and compression, and are stored in an image memory. Thereafter, the document is reversed to the back side (F33); the back side is read by a reading means and undergoes image processing, etc. (F34). On the other hand, through the detection (F36) of the document attributes information and the selection employing a selector (F35) by the above-mentioned image processing, they are stored in the image memory (F37, 38). At the time, reproduction upon employing the selector and image processing, etc. are carried out (F39, F40). On the other hand, the printing information is set (F42) and it is converted (1) to the output image data (F43) employing the data selected by the selector (F41) subjected to image processing of the front side, and stored in the image memory (F44). In the same way, the printing information is set (F42) and they are converted (2) to the output image data (F45) employing the data selected by the selector (F41) subjected to image processing of the rear side and they are stored in the image memory (F46). At the time, they are selected by the selector (F47) and writing the image is carried out (F48), and a printed image (F49) is obtained.

(Embodiment 4)

Figure 8:
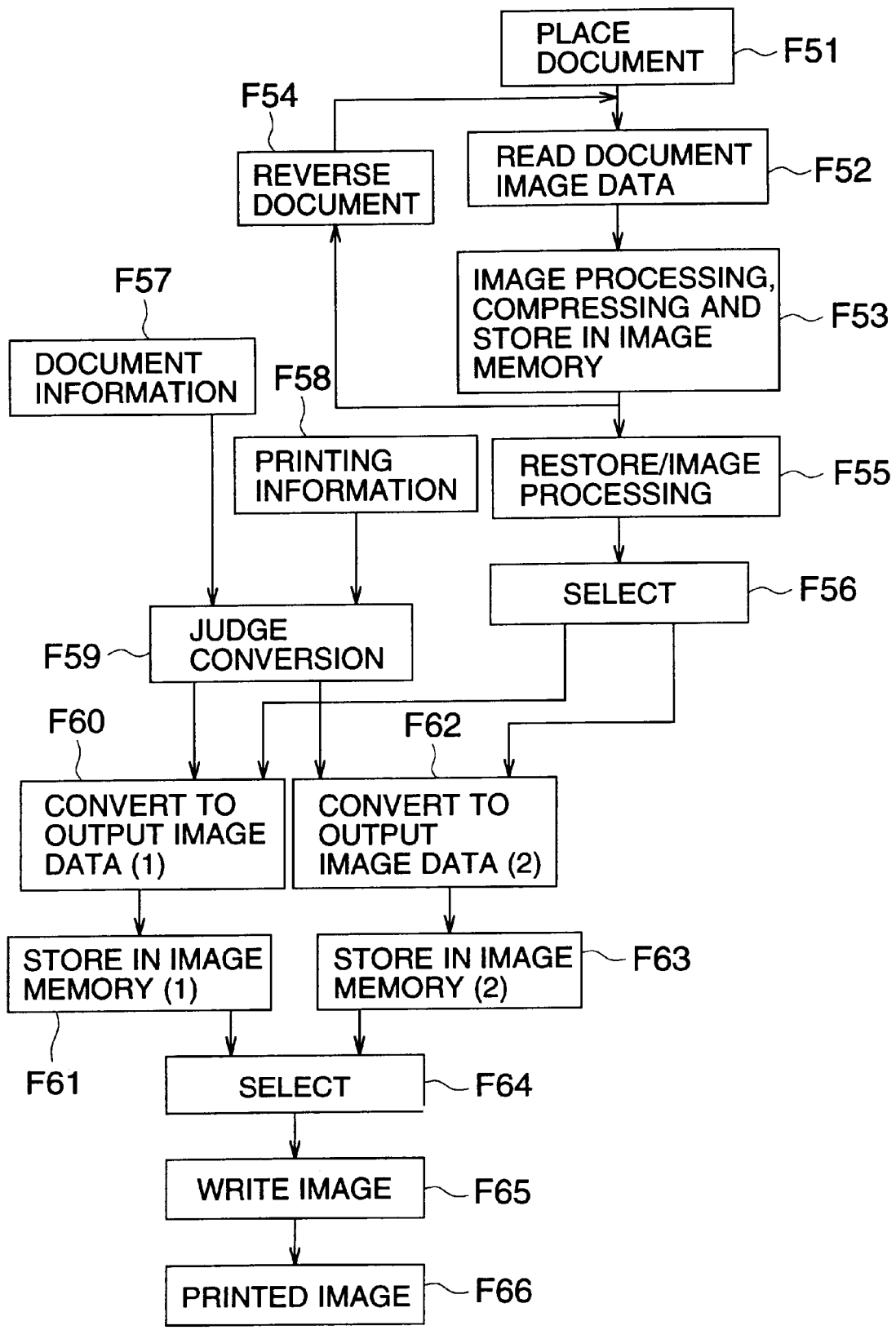
FIG. 8 is a flowchart illustrating main processes of a printing operation.

The image forming apparatus of Embodiment 4 is explained with reference to FIGS. 1, 6 and 8. FIG. 6 is a table illustrating the relationship between the above-mentioned document placing method as one example and a printed image. FIG. 8 is a flowchart illustrating main processes of a printing operation. Further, explanation on members which are mechanically, operationally the same as those in FIG. 1 are abbreviated.

Referring to FIG. 1, the difference from Embodiment 3 is explained. The document and printing information means which is a part of the control section 30 is a means to detect document attributes information and printing information.

Here, the printing operation is explained mainly on the difference from Embodiment 3 with reference to FIGS. 1, 6 and 8. A front side document is placed on the document position (F51) and the document image data are read (F52). Thereafter, they undergo image processing and compression, and are stored in the image memory (F53). At the time, the document is reversed to the back side by the document reversing means (F54). On the other hand, conversion judgment is carried out (F59) employing the document attributes information(F57) and printing information (F58) and further, the front side output image data (1) are made (F60) upon calling up the front side data through the selector (F56) according to the above-mentioned data subjected to image processing (F55) and stored (F61) into the image memory (1). In the same way, the back side data are called up by the selector (F56) according to the data subjected to the above-mentioned image processing (F55) and the back side output image data (2) are made (F62) and stored (F63) into the image memory (2). Thereafter, the selection is carried out by the selector (F64) and writing the image (F65) is carried out and a printed image is obtained (F66).

(Embodiment 5)

Figure 9:
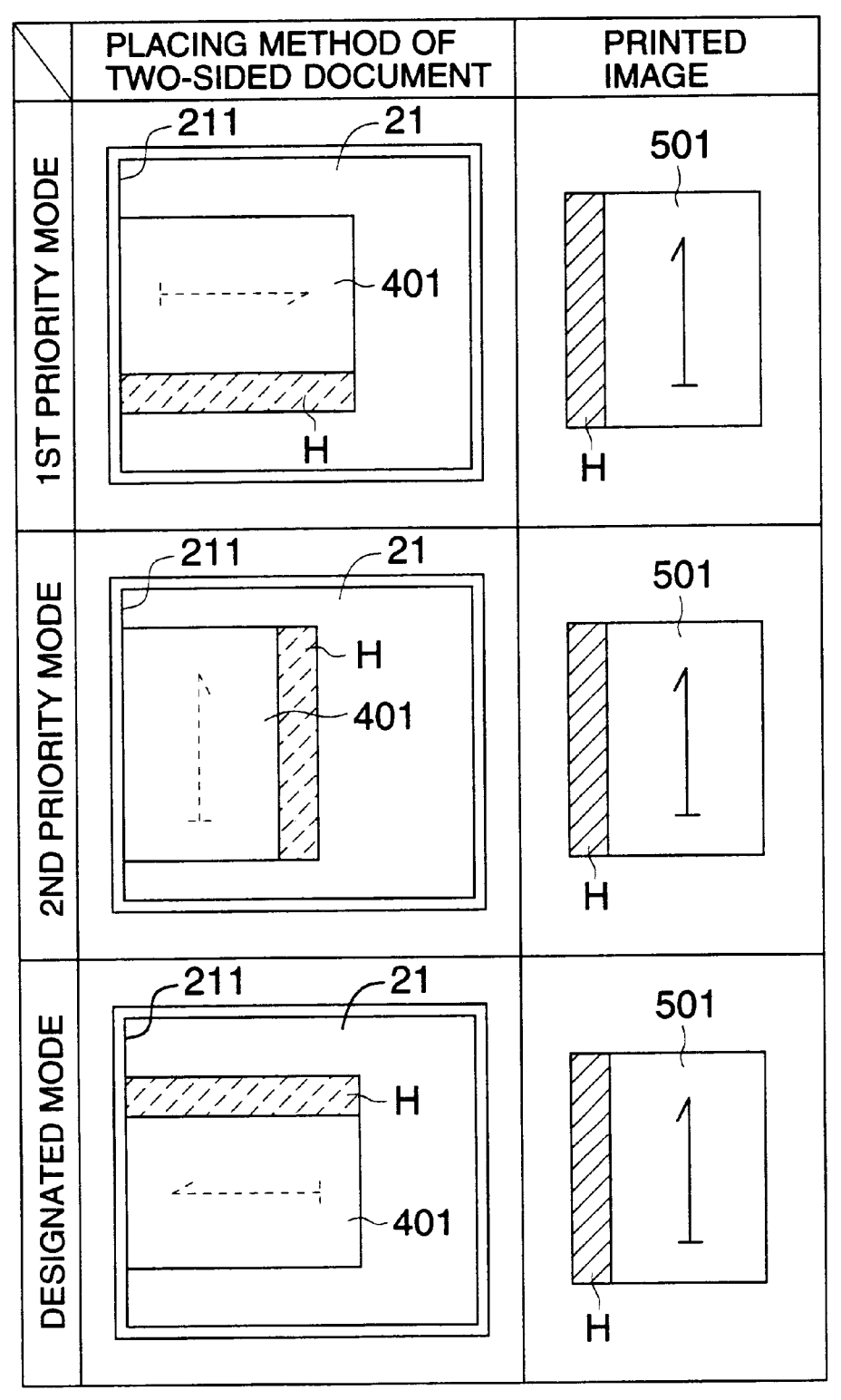

The image forming apparatus of Embodiment 5 is explained with reference to FIGS. 1 and 9. FIG. 9 is a table illustrating the relationship between a document placing method as one example and a printed image. Further, explanation on members which are mechanically, operationally the same as those in FIG. 1 are abbreviated.

In FIG. 1, one part of the control section 30 has a function which can select the print mode. Further, in an operation panel 24 is a key which can select the print mode.

In FIG. 9, the first priority print mode is a mode which has priority of the left binding margin direction of the printed image of the both-sided document 40 and the top direction of the printed image. Furthermore, the second priority print mode is a mode which has priority of that the binding margin direction and vertical direction of the document are the same as those of the printed image. Furthermore, the specified print mode is a print mode which has more priority of the binding margin direction and vertical direction of the document than those of the above-mentioned priority print mode.

Here, printing operation is explained.

(1) First Priority Print mode

The first priority print mode of an operation panel 24 is selected. The front side document 401 is placed on the document stopper 211 of the document platen 21. Thereafter, according to the methods of the above-mentioned Embodiments 1 to 3, the front side printed image 501 with the image upward is obtained.

(2) Second Priority Print mode

The second priority print mode of the operation panel 24 is set. The front side document 401 is placed on the document stopper 211 of the document platen 21. Thereafter, according to methods of the above-mentioned Embodiments 1 to 3, the front side printed image 501 is obtained which has the same binding margin direction and vertical direction of the document.

(3) Specified Print mode

The specified print mode of the operation panel 24 is set. The front side document 401 is placed at the document stopper 211 of the document platen 21. Thereafter, according to methods of Embodiments 1 to 3, the front side printed image 501 is obtained which gives priority to the binding margin direction and vertical direction of the document.

Further, the information on the binding margin direction of the document may be manually input upon observing the document. Or the document is read by a scanner and the binding margin direction may be estimated by pattern recognition according to the read image data.

(Embodiment 6)

Figure 10:
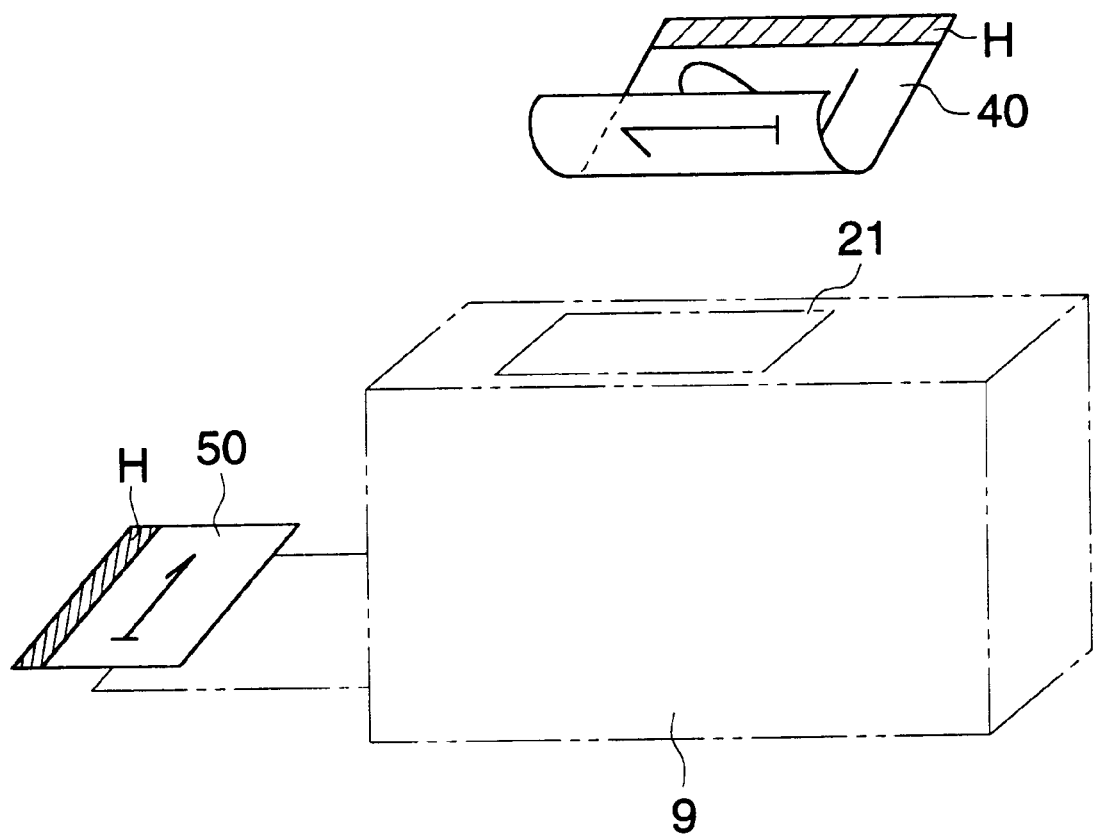
FIG. 10 is a view table illustrating the relationship between a document placing method as one example and a printed image.

Embodiment 6 is explained with reference to FIGS. 1 and 10. FIG. 10 is a view illustrating the relationship between a document placing method as one example and a printed image. Further, explanation on members which are mechanically, operationally the same as those in FIG. 1 are abbreviated.

In FIG. 1, one part of the control section 30 has a vertical/horizontal direction converting means which carries out the conversion of a vertical/horizontal direction of a document.

In FIG. 10, the image forming apparatus 9 has the document platen 21 and the document 40 is of a both-sided document. Further, the printed image 50 is of a both-sided print.

Here the printing operation is explained. The toner image formed on the image forming body by carrying out the conversion of a vertical/horizontal direction is transferred to the front side of the image receiving material P. On the other hand, the toner image formed on the image forming body by carrying out the conversion of a vertical/horizontal direction is once transferred to the toner image receiving body and then transferred again to the back side of the image receiving material to obtain a both-sided printed image.

(Embodiment 7)

Figure 11:
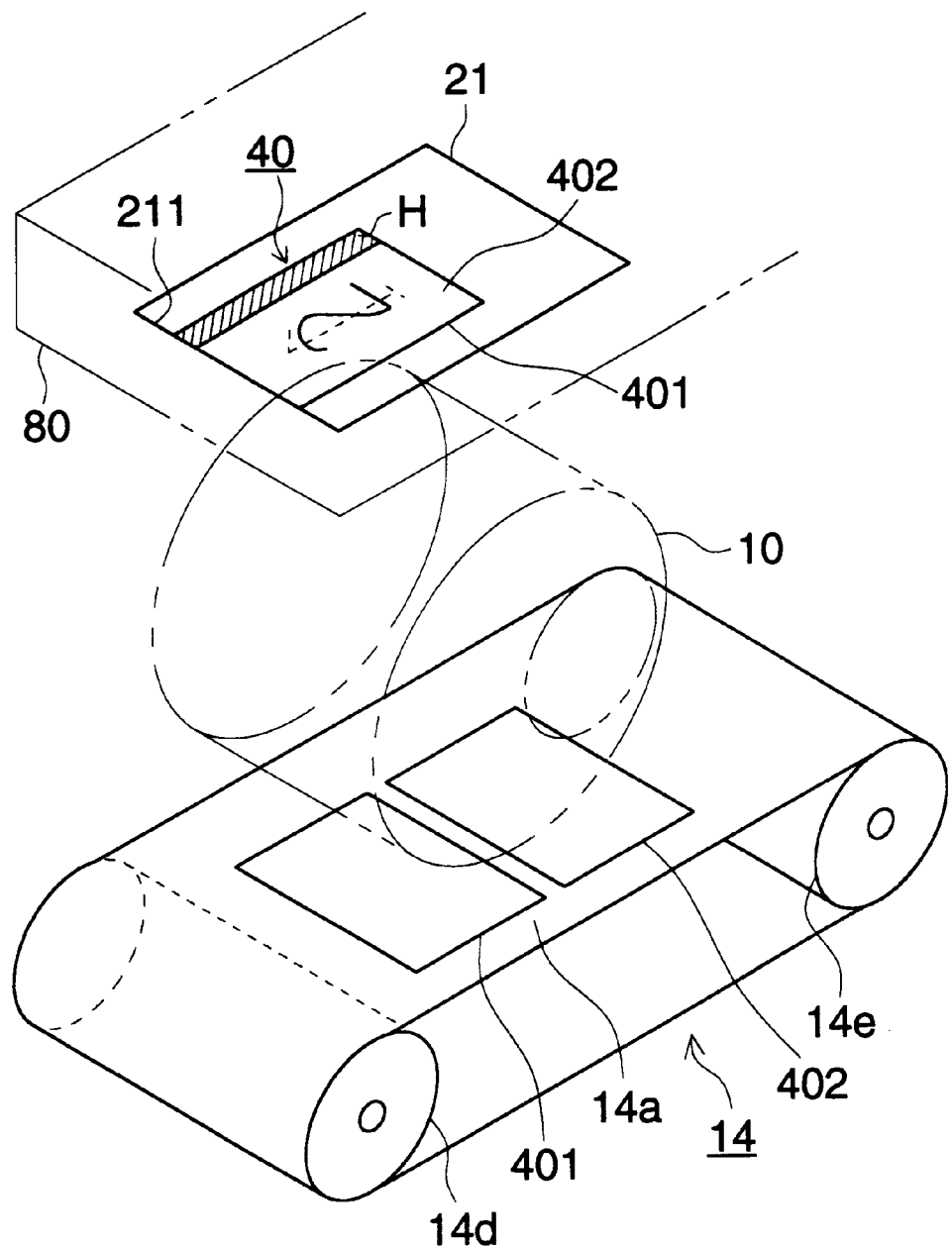
FIG. 11 is a perspective schematic diagram showing a main constructing part of an image forming apparatus.
Figure 13:
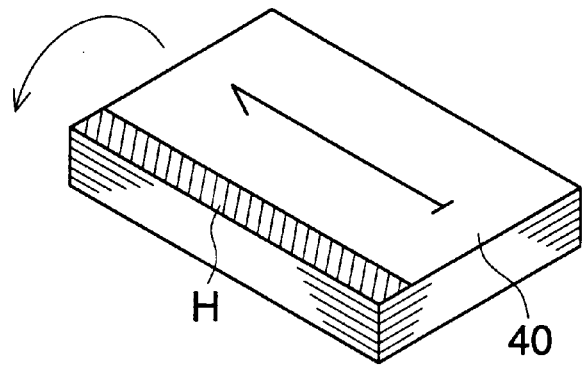
FIGS. 13(A), 13(B) and 13(C) show examples of kinds of documents.
Figure 13:
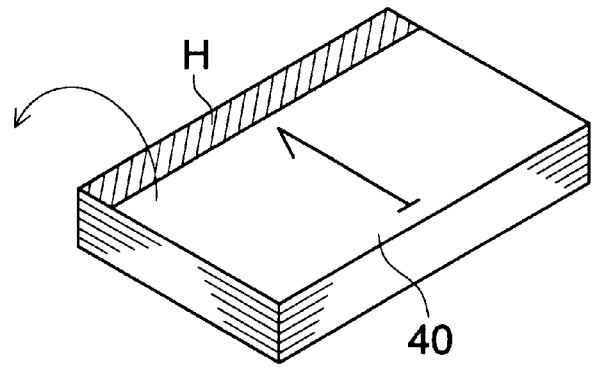
Figure 13:
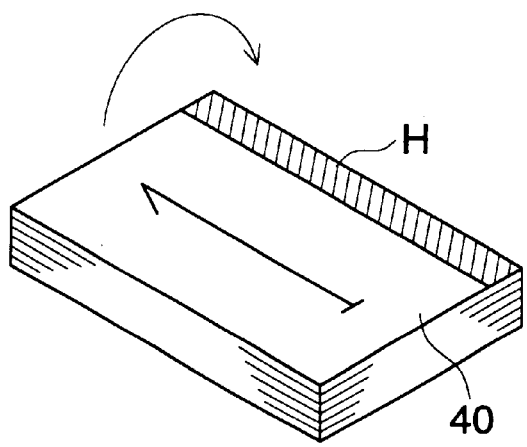
Figure 14:
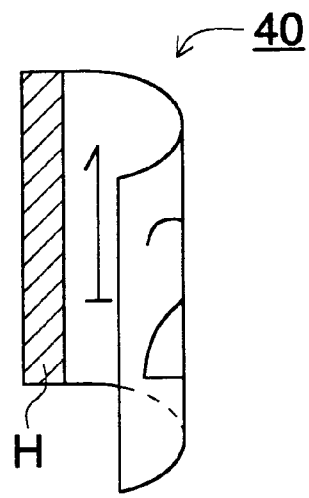
FIG. 14 is a chart illustrating the relationship between a document placing method as a conventional example and a printed image.

The Embodiment 7 is explained with reference to FIGS. 1 and 11. FIG. 11 is a perspective schematic diagram showing a main constructing part of an image forming apparatus. Further, explanation on members which are mechanically, operationally the same as those in FIG. 1 are abbreviated.

In FIG. 1, one part of the control section 30 comprises the right angle rotating means which rotates the document by a right angle. Furthermore, on the toner image receiving body 14, it is constructed so as to form a plurality of toner images.

As shown in FIG. 11, the both-sided document 40 is placed, while striking the document against the document stopper 211. Furthermore, the toner image receiving body 14 can form the front side and back side toner images.

Here, a printing operation is explained. Writing the image of the front side document 401 is carried out; the vertical document is converted to a the horizontal one so that the document can be placed on the toner image receiving body 14a; after the toner image formed on the image forming body 10 is transferred to the toner image receiving body 14a, writing the image of the back side document 402 is again carried out; after the toner image formed on the image forming body 10 is transferred to the toner image receiving body 14a, a plurality of the above-mentioned toner images are transferred to the image receiving material P and fixed and it is designed so that two sheets of one-sided printed image is simultaneously obtained.

(Embodiment 8)

The Embodiment 8 is explained with reference to FIGS. 1 and 12. FIG. 12 is a table illustrating the relationship between a document placing method as one example and a printed image. Explanation on members which are mechanically, operationally the same as those in FIG. 1 are abbreviated.

In FIG. 1, the cassette 15 is a cassette which receives the image receiving material P in a vertical or horizontal position. Furthermore, one part of the control section 30 comprises the vertical/horizontal direction converting means which carries out the conversion of a vertical/horizontal direction of the image receiving material P.

Referring to FIG. 12, the relationship between a document placing method as one example and a printed image. In No. 1 of the figure, the front side of the document 40 in a vertical position is struck against the document stopper 211 and a front side printed image 50 in a vertical position is obtained employing a vertical cassette. In the same way as in No. 2, the document 40 is struck in a horizontal position against the document stopper 211 and the front side printed image 50 in a vertical position is obtained employing a vertical cassette 151. In No. 3, the front side document 40 in a vertical position is struck against the document stopper 211 and the printed image 50 in a horizontal position is obtained employing a horizontal cassette 152. Furthermore, in the same way as in No. 4, the document 40 in a horizontal position is placed against the document stopper 211 and the printed image 50 in a horizontal position is obtained employing the horizontal cassette 152.

No. 2 is herein explained as a representative example of the printing operation. The document 40 is placed in a horizontal position on the document platen 21. Here, the image data read by the vertical/horizontal direction converting means are subjected to conversion of a vertical/horizontal direction, transferred and fixed to obtain a printed image in a vertical position.

According to the above construction, the following advantages are exhibited.

According to the present invention, information on a binding margin direction and vertical direction of a document is read and a desired printed image is readily obtained without depending on a placing way of the document.

Furthermore, according to the information on the printed image, a desired printed image is readily obtained.

Furthermore, according to the information on the document and print, a desired print is readily obtained.

Furthermore, a printed image is readily made, while the binding margin direction of a print has priority of the left binding margin and the vertical direction of the print has priority of the top direction of the image.

Furthermore, a printed image is readily made, while a print mode has priority in that the binding margin directions of a document and a print and the vertical direction of the document are the same.

Furthermore, a print mode makes it possible to have priority of specification for the binding margin direction of a document and the vertical direction of the document.

Furthermore, readily operated in order of one-sided page.

Furthermore, readily operated in order of both-sided page.

Furthermore, a both-sided print can be made efficiently and quickly.

Furthermore, a print can be made quickly.

Furthermore, a printed image can be readily made irrespective of document placing methods and kinds of cassettes.

What is claimed is:

1. An image forming apparatus comprising:
   (a) reversing means for reversing a two-sided document and placing the document on a platen;
   (b) reading means for reading image data of either a front or back side of the document placed on the platen by the reversing means;
   (c) at least one of: (i) first detecting/setting means for providing first information representing a position on which a binding margin of the document is located and a direction in which a top or bottom portion of the document is directed, and (ii) second detecting/setting means for providing second information representing a position on which a binding margin of an image to be printed is located and a direction in which a top or bottom portion of the image to be printed is directed;
   (d) image converting means for converting the read image data into output image data according to at least one of: (i) the first information with respect to the position of the binding margin of the document and the direction of the document, and (ii) the second information with respect to the position of the binding margin of the image to be printed and the direction of the image to be printed; and
   (e) writing means for printing the image to be printed according to the output image data.

2. The image forming apparatus of claim 1, wherein the image forming apparatus is operable in a printing mode having priority with respect to a left binding margin direction of the image to be printed and a top direction of the image to be printed.

3. The image forming apparatus of claim 1, wherein the image forming apparatus is operable in a printing mode having priority with respect to the position of the binding margin of the document and the direction of the document being identical to the position of the binding margin of the image to be printed and the direction of the image to be printed, respectively.

4. The image forming apparatus of claim 1, wherein the image forming apparatus is operable in a printing mode having priority with respect to a designated position of the binding margin of the document and a designated direction of the document.

5. The image forming apparatus of claim 1, wherein the image data is stored in an image memory in an order of one-sided pages based on the first information representing the position of the binding margin of the document and the direction of the document.

6. The image forming apparatus of claim 1, wherein the image data is stored in an image memory in an order of two-sided pages based on the first information representing the position of the binding margin of the document and the direction of the document.

7. The image forming apparatus of claim 1, further comprising:
   a toner image receiving body for receiving temporarily thereon a toner image of the document formed on an image carrier, and for transferring the toner image onto a back side of a recording material, on a front side of which another toner image has been formed; and
   a vertical and horizontal directions converting means for converting the image data of the document between vertical and horizontal directions;
   wherein toner images corresponding to the image data converted by the vertical and horizontal directions converting means are formed on the recording material to form a two-sided printed image.

8. The image forming apparatus of claim 7, wherein the conversion between the vertical direction and the horizontal direction of the document is carried out so that a plurality of toner images can be stored on the toner image receiving body.

9. The image forming apparatus of claim 7, wherein the conversion between the vertical direction and the horizontal direction of the document is timely carried out in accordance with one of: (i) a placing direction of the document on the platen where the document is placed either in the vertical or the horizontal direction, and (ii) a selected sheet cassette in which the recording material is stored either in the vertical or the horizontal direction, so that printed images can be formed on a predetermined position on the recording material irrespective of the placing direction of the document and the selected sheet cassette.

* * * * *